US008521809B2

(12) United States Patent
Arnold et al.

(10) Patent No.: US 8,521,809 B2
(45) Date of Patent: Aug. 27, 2013

(54) MOBILE DEVICE NOTIFICATION CONTROLS SYSTEM AND METHOD

(75) Inventors: Jordan Douglas Arnold, Bainbridge Island, WA (US); Damon Vincent Danieli, Bellevue, WA (US); David Bryn Bluhm, Issaquah, WA (US)

(73) Assignee: Z2Live, Inc., Seattle, WA (US)

( * ) Notice: Subject to any disclaimer, the term of this patent is extended or adjusted under 35 U.S.C. 154(b) by 370 days.

(21) Appl. No.: 12/848,867

(22) Filed: Aug. 2, 2010

(65) Prior Publication Data

US 2011/0029598 A1 Feb. 3, 2011

Related U.S. Application Data

(60) Provisional application No. 61/230,448, filed on Jul. 31, 2009.

(51) Int. Cl.
*G06F 15/16* (2006.01)

(52) U.S. Cl.
USPC .............. 709/203; 709/217; 709/223; 463/42

(58) Field of Classification Search
USPC ................. 709/203, 206, 217, 219, 223, 224; 455/412.1, 414.1, 557; 463/42
See application file for complete search history.

(56) References Cited

U.S. PATENT DOCUMENTS

| | | | | |
|---|---|---|---|---|
| 6,421,781 B1 * | 7/2002 | Fox et al. | ........................... | 726/4 |
| 7,752,272 B2 * | 7/2010 | Schmidt | ........................ | 709/206 |
| 7,898,423 B2 * | 3/2011 | Cavanaugh | ................ | 340/573.1 |
| 8,064,896 B2 * | 11/2011 | Bell et al. | .................... | 455/422.1 |
| 8,244,822 B1 * | 8/2012 | Lowry et al. | ................... | 709/206 |
| 8,351,921 B2 * | 1/2013 | Bell et al. | ................... | 455/422.1 |
| 8,412,833 B2 * | 4/2013 | Vyrros et al. | ................. | 709/227 |
| 2003/0224760 A1 * | 12/2003 | Day | ........................... | 455/412.1 |
| 2004/0073619 A1 * | 4/2004 | Gilhuly et al. | ................ | 709/206 |
| 2005/0154759 A1 * | 7/2005 | Hofmeister et al. | ........ | 707/104.1 |
| 2006/0190526 A1 * | 8/2006 | Neil et al. | ...................... | 709/203 |
| 2007/0180037 A1 * | 8/2007 | Cheng et al. | ................... | 709/206 |
| 2008/0311886 A1 * | 12/2008 | Smith | ........................ | 455/412.1 |
| 2009/0003275 A1 * | 1/2009 | Shenfield et al. | ............. | 370/329 |
| 2010/0173658 A1 * | 7/2010 | Fan et al. | ...................... | 455/466 |
| 2010/0198963 A1 * | 8/2010 | Conneely et al. | ............ | 709/224 |
| 2010/0319062 A1 * | 12/2010 | Danieli et al. | ..................... | 726/7 |
| 2011/0087725 A9 * | 4/2011 | Neil et al. | ...................... | 709/203 |
| 2011/0252145 A1 * | 10/2011 | Lampell et al. | ............... | 709/227 |
| 2011/0289172 A1 * | 11/2011 | Marcellino | ................... | 709/206 |
| 2012/0040699 A1 * | 2/2012 | Bell et al. | ...................... | 455/466 |
| 2012/0252079 A1 * | 10/2012 | Zhu et al. | ...................... | 435/134 |
| 2012/0309540 A1 * | 12/2012 | Holme et al. | ................... | 463/42 |
| 2012/0315993 A1 * | 12/2012 | Dumont et al. | ................. | 463/42 |
| 2013/0072308 A1 * | 3/2013 | Peck et al. | ...................... | 463/42 |

* cited by examiner

*Primary Examiner* — Lashonda Jacobs

(74) *Attorney, Agent, or Firm* — Æ ON Law; Adam L. K. Philipp

(57) ABSTRACT

Provided herein are systems and methods for facilitating mobile device users to control notifications pushed to their mobile devices.

21 Claims, 14 Drawing Sheets

MOBILE DEVICE NOTIFICATION CONTROLS SYSTEM AND METHOD

CROSS REFERENCE TO RELATED APPLICATIONS

This application claims the benefit of priority to Provisional Application No. 61/230,448, filed Jul. 31, 2009, titled "Z2 Live Push Notification Permissions," and naming the following inventors: Jordan Douglas Arnold, Damon Vincent Danieli, and David Bryn Bluhm. The above-cited application is incorporated herein by reference in its entirety, for all purposes.

FIELD

The present disclosure relates to networked computing, and, more particularly, to systems and methods for facilitating mobile device users to control notifications pushed to their mobile devices.

BACKGROUND

In general, "push" technology refers to a style of network communication in which a given transaction is initiated by the publisher or central server. (By contrast, "pull" technology refers to a style of network communication in which a given transaction is initiated by receiver or client.) Push services are often based on a publish/subscribe model. For example, a client might "subscribe" to various information "channels" provided by a publisher. When new content is available on one of those channels, the server would push that information out to the client.

Some mobile-device platform providers may provide a centralized, general-purpose "Push" notification system. For example, various versions of the iOS mobile operating system, provided by Apple Inc. of Cupertino Calif., enable "Push Notifications" in which an application on the sender's device (e.g., an iPhone, iPod Touch, iPad, and the like) can send a notification to the receiver's device through the Apple Push Notification Service ("APNS"). The notification may (or may not) subsequently appear on the receiver's device. The receiver can typically dismiss the notification or accept the notification, which will launch the application with data stored in the message.

The APNS works only when both sender and receiver have installed the application in question, when both users have run the application, and when the receiver has indicated that it will accept push notifications for a given application by uploading a "Push Token" to the server of the Push Notification Provider. Once all of these conditions have been met, an application on another device can push a notification to the application on the device that generated that Push Token.

Similarly, some versions of the Android mobile operating system (provided by the Open Handset Alliance) support push notifications via Android Cloud to Device Messaging ("C2DM"), which was developed by Google Inc. of Menlo Park, Calif. To enable C2DM, an application on a recipient client device obtains a registration ID and provides the registration ID to a push server. The push server communicates with C2DM servers, which route pushed notifications to the client device. The client device "wakes up" the appropriate application to process the pushed notification. The application can unregister with C2DM when the user no longer wants to receive notifications pushed to the application.

DESCRIPTION

Figure 1:
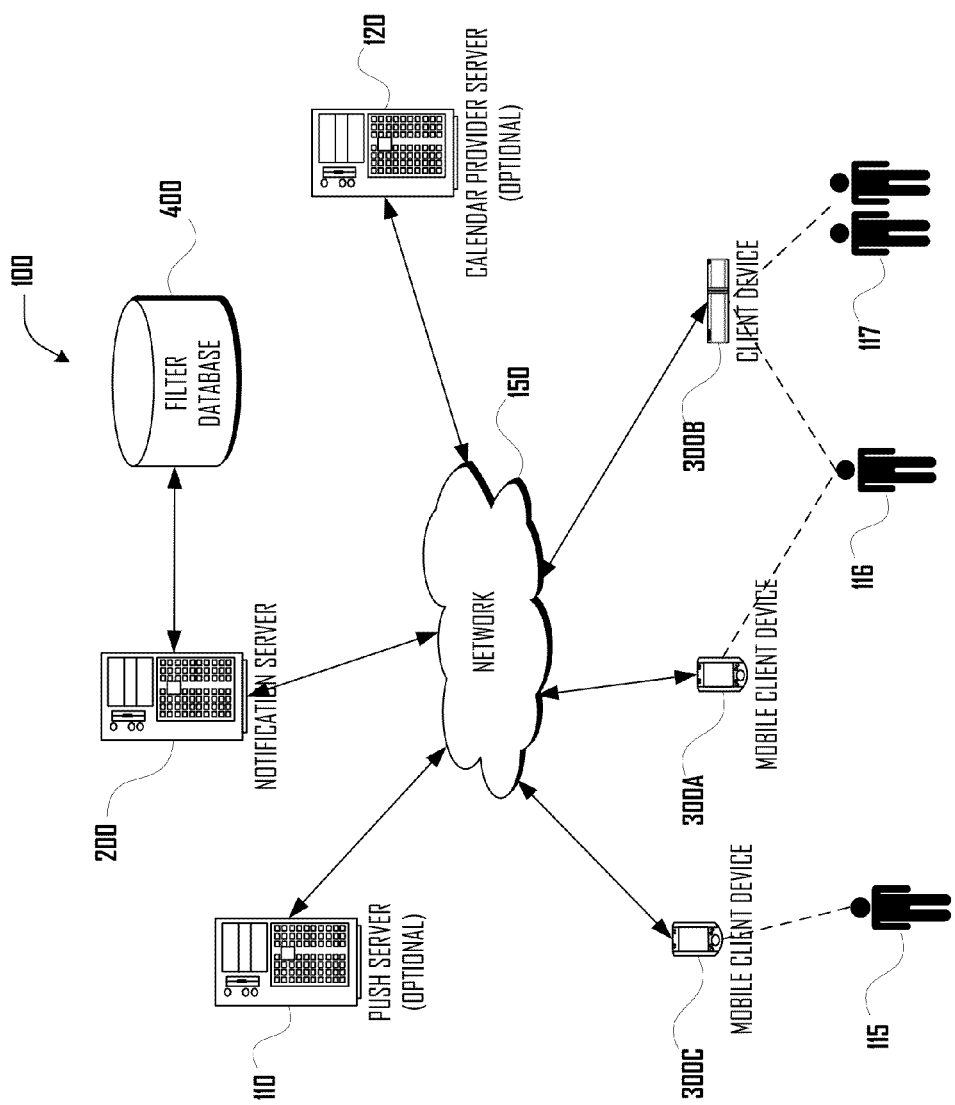
FIG. 1 illustrates an exemplary notification-controls system in accordance with one embodiment.

One problem with the generally-known push notification systems discussed above is that the user is given little control over push notifications beyond merely opting in or out for each application. However, some notifications (e.g., an invitation to join a multi-device game session) may be desirable at certain times, but may be distracting annoyances at other times (e.g., while the user is at work, in class, asleep, and the like). With existing opt-in/opt-out notification controls, the receiving user may be forced to completely opt-out of receiving push notifications for an application in order to avoid receiving notifications at undesirable times.

In accordance with various embodiments, as discussed below, a receiving user may have fine-grained control over the receipt of push notifications, filtering push notifications on a case-by-case basis to determine whether the receiver is receptive to the notifications. In various embodiments, the receiving user may filter push notifications according to various parameters, such as by sender, by sending/receiving application, by time/day, by the sender and/or receiver's geographical location, and the like.

In one embodiment, a receiving user may manage push notification filters via a user interface within a Z2 Live-enabled mobile application, a Z2 Live Dashboard, and/or via the Z2 Live Service Website (all of which are provided by Z2 Live of Seattle, Wash., the assignee of the present application). Further information about the Z2 Live Service, and the technology platform used to implement the Z2 Live Service, may be found in co-pending U.S. patent application Ser. No. 12/816,282, filed Jun. 15, 2010, titled "INVITATION SERVICE FOR MULTI-DEVICE APPLICATION SESSIONS," and naming inventor Damon. V. Danieli. The above-cited application is incorporated herein by reference in its entirety, for all purposes.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers, and/or memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates an exemplary notification-controls system 100 in which client devices 300A-C and a notification server 200 are connected to a network 150 in accordance with one embodiment. Each of client devices 300A-C is used by (or otherwise associated with) one or more users 115-117. In various embodiments, users may be associated with devices in one-to-many, one-to-one, many-to-one, and/or many-to-many relationships.

In various embodiments, as discussed at length below, notification server 200 facilitates one or more of users 115-117 to control their conditional receptivity to push notifications received from other ones of users 115-117.

In some embodiments, other servers and/or devices (not shown) may also be present. For example, in some embodiments, push server 110 may be present, working in concert with notification server 200 to push notifications out to some or all of client devices 300A-C. In some embodiment, push server 110, when present, may be operated by a platform provider. For example, in one embodiment, push server 110 may comprise an APNS server for delivering push notifications to iOS devices. In another embodiment, push server 110 may comprise a C2DM server for delivering push notifications to Android devices. In other embodiments, notification server 200 may be able to push notifications to client devices 300A-C on its own. In some embodiments, one or more calendar provider servers 120 or other mobile data provider servers (not shown) may also be present.

Notification server 200 is also connected to filter database 400. In various embodiments, filter database 400 may store persisted filters and/or other notification controls, as discussed below. In some embodiments, filter database 400 may also store other information related to user accounts and/or devices. In some embodiments, notification server 200 may communicate with filter database 400 via network 150, a storage area network ("SAN"), a high-speed serial bus, and/or via other suitable communication technology.

In some embodiments, notification server 200 and/or filter database 400 may comprise one or more replicated and/or distributed physical or logical devices.

In various embodiments, network 150 may include the Internet, a local area network ("LAN"), a wide area network ("WAN"), a cellular data network, and/or other data network. In many embodiments, there may be more client devices 300 than are illustrated.

Figure 2:
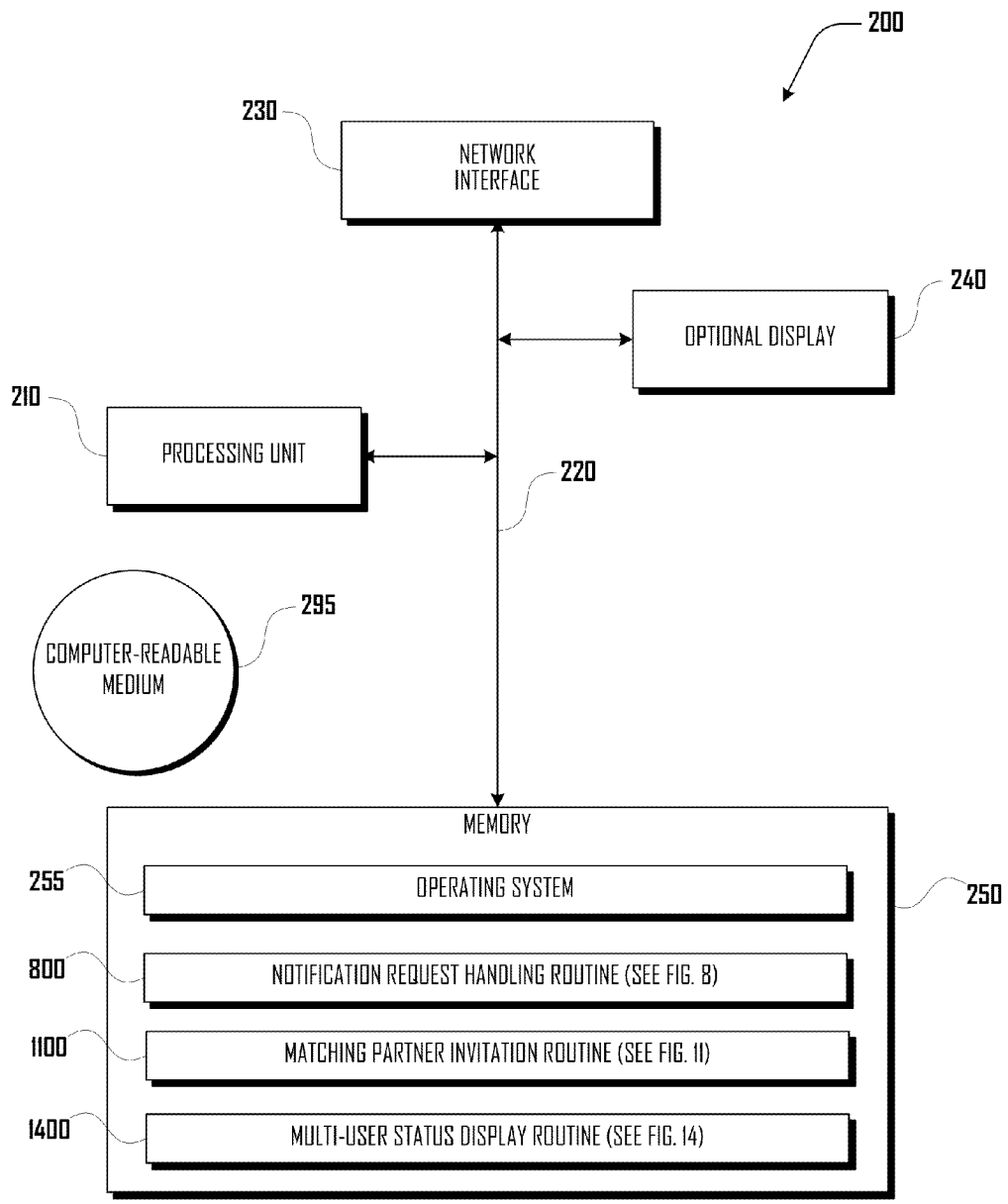
FIG. 2 illustrates several components of an exemplary notification server in accordance with one embodiment.

FIG. 2 illustrates several components of an exemplary notification server 200 in accordance with one embodiment. In some embodiments, notification server 200 may include many more components than those shown in FIG. 2. However, it is not necessary that all of these generally conventional components be shown in order to disclose an illustrative embodiment. As shown in FIG. 2, notification server 200 includes a network interface 230 for connecting to the network 150.

The notification server 200 also includes a processing unit 210, a memory 250, and an optional display 240, all interconnected along with the network interface 230 via a bus 220. The memory 250 generally comprises a random access memory ("RAM"), a read only memory ("ROM"), and a permanent mass storage device, such as a disk drive. The memory 250 stores program code for a notification request handling routine 800 (see FIG. 8, discussed below) and a matching partner invitation routine 1100 (see FIG. 11, discussed below). In addition, the memory 250 also stores an operating system 255. These software components may be loaded from a computer readable storage medium 295 into memory 250 of the notification server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

Notification server 200 also communicates via bus 220 with filter database 400. In various embodiments, bus 220 may comprise a storage area network ("SAN"), a high-speed serial bus, and/or via other suitable communication technology. In some embodiments, notification server 200 may communicate with filter database 400 via network interface 230.

Figure 3:
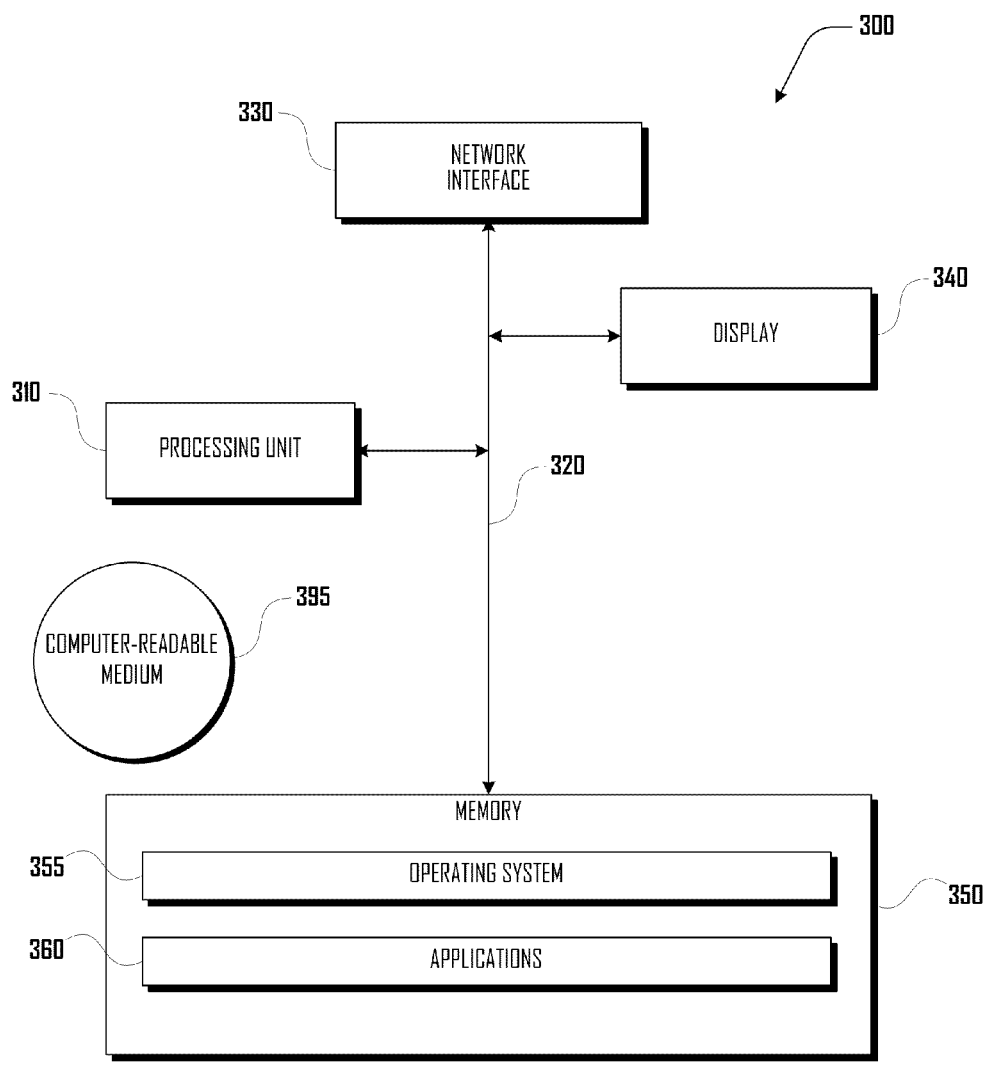
FIG. 3 illustrates several components of an exemplary client device in accordance with one embodiment.

FIG. 3 illustrates several components of an exemplary client device 300 in accordance with one embodiment. In some embodiments, client device 300 may include many more components than those shown in FIG. 3. However, it is not necessary that all of these generally conventional components be shown in order to disclose an illustrative embodiment. As shown in FIG. 3, the client device 300 includes a network interface 330 for connecting to the network 150.

The client device 300 also includes a processing unit 310, a memory 350, and a display interface 340, all interconnected along with the network interface 330 via a bus 320. The memory 350 generally comprises a random access memory ("RAM"), a read only memory ("ROM"), and a permanent mass storage device, such as a disk drive, flash device, or the like. The memory 350 stores program code for one or more mobile applications that may receive push notifications. In addition, the memory 350 also stores an operating system 355. These software components may be loaded from a computer readable storage medium 395 into memory 350 of the client device 300 using a read mechanism (not shown) associated with a non-transient computer readable storage medium 395, such as a floppy disc, tape, DVD/CD-ROM drive, memory card, or the like. In some embodiments, software components may also be loaded via the network interface 330, rather than via a computer readable storage medium 395.

Although an exemplary client device 300 has been described that generally conforms to conventional general purpose computing devices, a client device 300 may be any of a great number of devices capable of communicating with the network 150 and executing multi-device applications, for example, a personal computer, a game console, a set-top box, a handheld computer, a cell phone, or any other suitable device.

Figure 4:
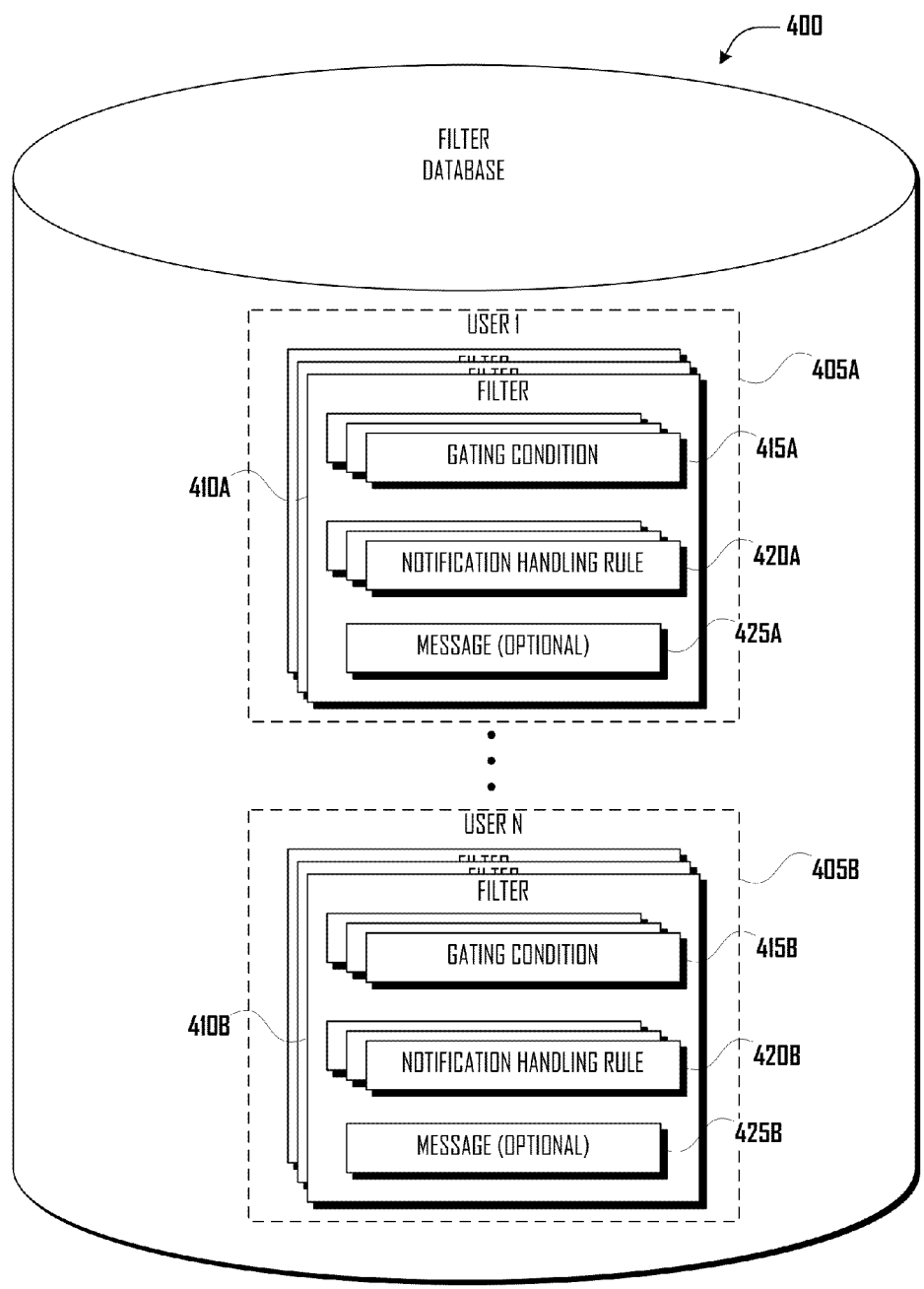
FIG. 4 illustrates an exemplary filter database in accordance with one embodiment.

FIG. 4 illustrates an exemplary filter database 400 in accordance with one embodiment. Filter database 400 stores one or more filters 410A-B associated with a plurality of users 405A-B. Each filter includes one or more gating conditions 415A-B and one or more notification handling rules 420A-B that collectively describe a receiving user's receptivity to push notifications under various circumstances.

As the term is used herein, a "gating condition" defines or describes one or more circumstances that must exist (or must not exist) before a notification-handling rule 420 may be applied. For example, in various embodiments, a gating condition 415 may describe a time period (which may include describing a day and/or date range), such as 10 P.M.-8 A.M. every day; 9 A.M.-10 A.M. and 11 A.M.-1 P.M. Monday, Wednesday, and Friday; the first Saturday of every month; 2 P.M.-4 P.M. Jul. 26, 2010; and the like. In other embodiments, a gating condition 415 may define a set of one or more sending users of a prospective push notification. In other embodiments, a gating condition 415 may define a set of one or more sending and/or receiving applications of a prospective push notification. In still other embodiments, a gating condition 415 may define a set of one or more geographical locations of a sending user and/or a receiving user of a prospective push notification. The above examples are not exclusive, nor are they limiting, and in other embodiments, other types of gating conditions may be employed.

In some embodiments, a filter 410 may also include one or more implicit or explicit logical operators (not shown) for combining multiple gating conditions. For example, in one embodiment, multiple gating conditions of the same type (e.g., multiple time-period conditions, multiple sending-user conditions, multiple receiving-user-geographical location conditions, and the like) may be satisfied if any one of the conditions of that type are satisfied, while the filter as a while may be satisfied only if all different groups of same-type conditions are satisfied. In other words, multiple gating conditions of the same type may be logically disjoined, while multiple groups of same-type gating conditions may be logically conjoined. For example, consider a filter having four gating conditions: A) 9 A.M.-10 A.M. (time-type); B) 1 P.M.-2 P.M. (time-type); C) John (sending-user type); D) Mary (sending-user type). In one embodiment, the filter's conditions may collectively be satisfied if a prospective notification arrives either 9 A.M.-10 A.M. OR 1 P.M.-2 P.M., AND if the prospective notification is sent from either John OR Mary.

In other embodiments, multiple gating conditions within a filter may have different implicit logical relationships than those just described and/or a filter may specify explicit logical relationships between multiple gating conditions.

A "notification handling rule" specifies an action to be taken with respect to a prospective notification when a filter's gating condition(s) 415 are collectively satisfied. For example, in one embodiment, a notification-handling rule may specify that prospective push notifications satisfying a filter's gating conditions be delivered immediately (delivery-type notification handling rule). In other embodiments, a notification-handling rule may specify that prospective push notifications satisfying a filter's gating conditions be discarded (discard-type notification handling rule). In still other embodiments, a notification-handling rule may specify that prospective push notifications satisfying a filter's gating conditions be queued for later delivery (queue-type notification handling rule). Collectively, notification-handling rules that specify whether and/or when a notification should be delivered (e.g., delivery-type, discard-type, and queue-type notification handling rules) are referred to as "receptivity" notification handling rules.

Other embodiments may include different notification handling rules and/or different types of notification handling rules. For example, some embodiments may include additional notification handling rules that specify that the sending user should (or should not) be notified of the action taken with regard to the prospective notification (e.g., notify the sending user that the push notification request was discarded or queued for later delivery). Other embodiments may include presentation-related notification handling rules, such as rules that specify that, when a push notification is delivered to a receiving device, the receiving device should present the notification with or without a notification sound, with a specified notification sound, with or without a notification message, with a specified notification message, with or without an icon badge, and the like.

In some embodiments, a filter 410 may also include additional features, such as a status message 425 that may be displayed when the filter's gating conditions are satisfied (see, e.g. FIG. 13, discussed below), a filter priority indication (not shown), an indication (not shown) of how multiple gating conditions (if present) logically relate, and the like.

Figure 5:
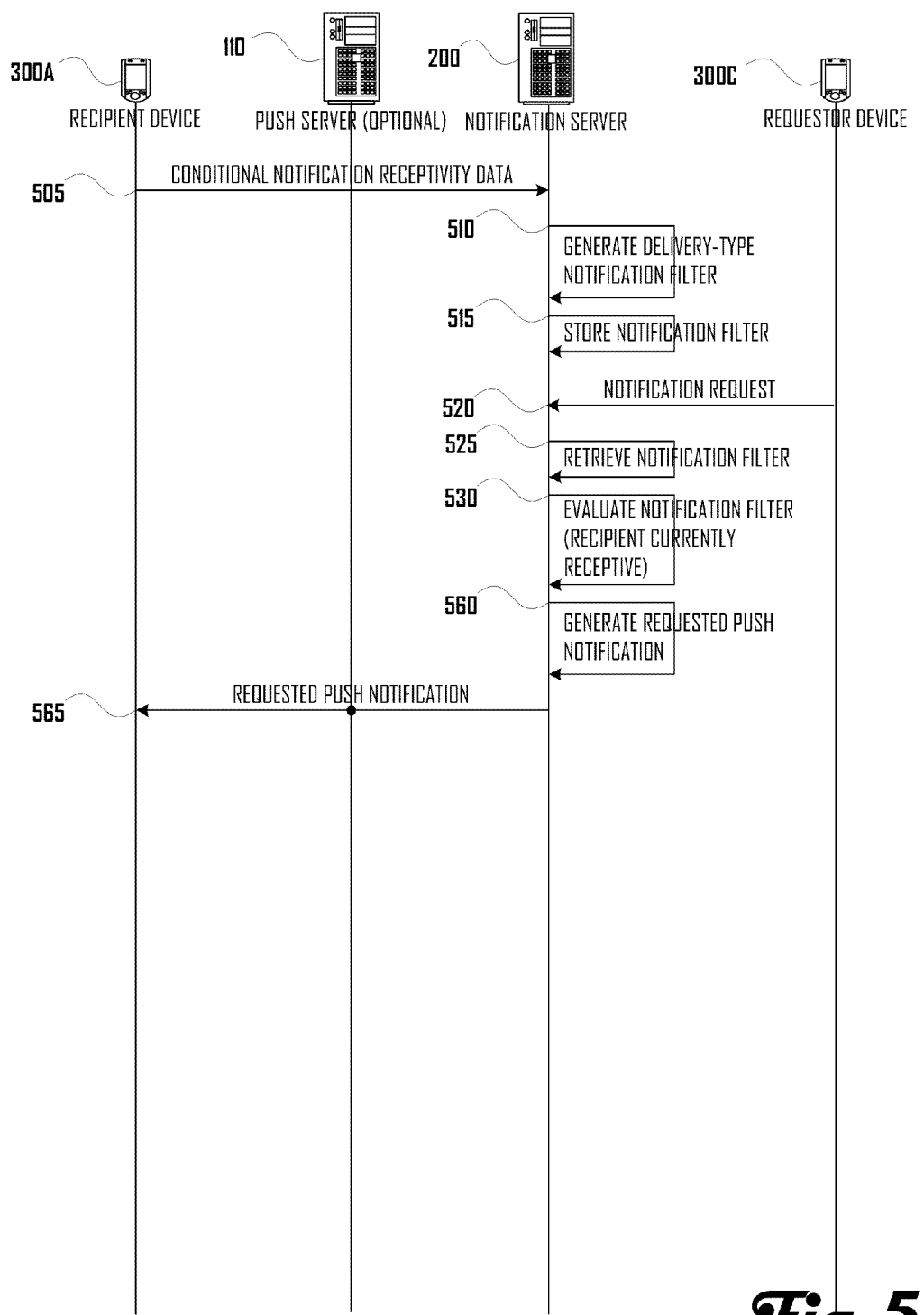
FIGS. 5-7 illustrates an exemplary series of communications between notification-requesting client device, notification server, optional platform push server, and notification-receiving client device, in accordance with various embodiments.

FIG. 5 illustrates an exemplary series of communications between notification-requesting client device 300C, notification server 200, optional push server 110, and notification-receiving client device 300A, in accordance with one embodiment. The illustrated series of communications shows an exemplary scenario in which a user on notification-receiving client device 300A specifies one or more conditions under which a receiving user is receptive to a push notification from notification-requesting client device 300C.

Beginning the illustrated sequence of operations, the receiving user of notification-receiving client device 300A provides 505 to notification server 200 data indicative of the receiving user's conditional receptivity to push notifications. For example, in one embodiment, notification server 200 may provide an invitation-control web page allowing the user to specify gating conditions and notification handling rules. In other embodiments, notification server 200 may provide an invitation-control web application programming interface ("Web API") by which an application on the receiving user's device 300A may communicate the user's receptivity data, it having been gathered via a user interface provided on the receiving user's device 300A by the application. In still other embodiments, notification server 200 may obtain electronic calendar data associated with the user (e.g., via communication with calendar provider server 120), from which conditional receptivity data may be inferred. In some embodiments, electronic calendar data associated with the user may be obtained automatically according to a pre-determined schedule. In other embodiments, electronic calendar data associated with the user may be provided on one or more occasions by the receiving user.

In the embodiment illustrated in FIG. 5, the receiving user's conditional notification receptivity data indicates that the receiving user is receptive to push notifications under certain specified gating conditions.

Having received 505 the data indicative of the receiving user's conditional receptivity to push notifications, notification server 200 generates 510 a notification filter accordingly. In some embodiments, generating 510 a notification filter may simply comprise populating a data structure according to explicit user receptivity indications. For example, the user's conditional notification receptivity data may indicate that notifications should be delivered between 7 P.M.-9 P.M. on Tuesdays, in which case generating 510 a notification filter may comprise creating a time-type gating condition and a delivery-type notification handling rule, and storing the gating condition and notification handling rule in a filter data structure.

In other embodiments, generating 510 a notification filter may comprise analyzing electronic calendar data associated with the user and automatically inferring gating conditions and/or notification handling rules. For example, in one embodiment, time-type gating conditions may be inferred according to events and/or appointments indicated by the electronic calendar data associated with the user. In other words, some or all events and/or appointments indicated by the electronic calendar data may be treated as potential filters, each having a time-type gating condition corresponding to times and/or dates associated with an event and/or appointment. In some embodiments, notification handling rules for such potential filters may be indicated by the receiving user, e.g. via an interactive user interface provided by an application on the user's client device and/or by notification server 200.

In other embodiments, notification-handling rules for such potential filters may be automatically determined according to attributes of the corresponding events and/or appointments. For example, in one embodiment, delivery-type notification handling rules may automatically be implemented for appointments having meta-data indicating that the receiving user may be idle or otherwise receptive to notifications (e.g., a calendar item corresponding to a layover between flights).

In the embodiment illustrated in FIG. 5, the generated notification filter's notification handling rule(s) indicates that push notifications that satisfy the indicated gating condition(s) be delivered to the receiving user.

Having generated a notification filter, notification server 200 stores 515 the generated delivery-type notification filter associated with the receiving user in an electronic data store, e.g. filter database 400.

At some point, notification server 200 receives 520 a request to push a notification to notification-receiving client device 300A from a requesting user of notification-requesting client device 300C. Notification server 200 then retrieves 525 one or more notification filters associated with the receiving user from the electronic data store (e.g., filter database 400). Notification server 200 then evaluates 530 the retrieved one or more notification filters.

In the embodiment illustrated in FIG. 5, the received notification request is determined to satisfy the gating condition(s) of the delivery-type notification filter that was generated 510 and stored 515 in the electronic data store. Applying the notification filter's notification handling rule(s), notification server 200 generates 560 the requested push notification and provides 565 the requested push notification to notification-receiving client device 300A. In some embodiments, the requested push notification may be delivered to the notification-receiving client device 300A via optional push server 110.

Figure 6:
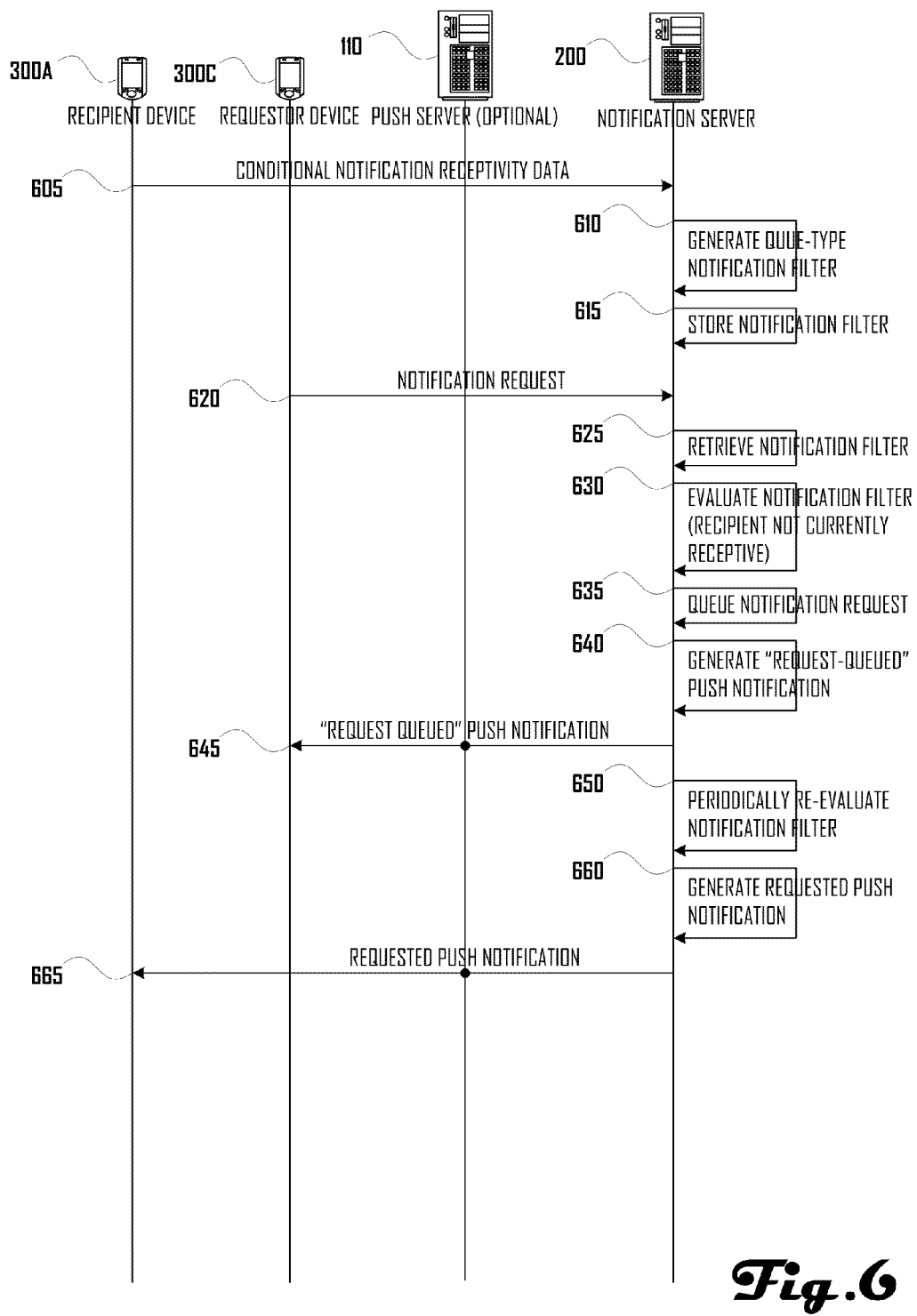

FIG. 6 illustrates an exemplary series of communications between notification-requesting client device 300C, notification server 200, optional push server 110, and notification-receiving client device 300A, in accordance with one embodiment. The illustrated series of communications shows an exemplary scenario in which a user on notification-receiving client device 300A specifies one or more conditions under which a receiving user is temporarily not receptive to a push notification from notification-requesting client device 300C.

Beginning the illustrated sequence of operations, the receiving user of notification-receiving client device 300A provides 605 to notification server 200 data indicative of the receiving user's conditional receptivity to push notifications.

In the embodiment illustrated in FIG. 6, the receiving user's conditional notification receptivity data indicates that the receiving user is not receptive to push notifications under certain specified exclusionary gating conditions, but that the receiving user may be receptive to the same push notifications once the exclusionary gating conditions are no longer satisfied.

Having received 605 the data indicative of the receiving user's conditional receptivity to push notifications, notification server 200 generates 610 a notification filter accordingly. In some embodiments, generating 610 a notification filter may simply comprise populating a data structure according to explicit user receptivity indications.

For example, the user's conditional notification receptivity data may indicate that notifications should be queued between 9 A.M.-6 P.M. on weekdays, in which case generating 610 a notification filter may comprise creating a time-type gating condition and a queue-type notification handling rule, and storing the gating condition and notification handling rule in a filter data structure.

In other embodiments, as discussed above, generating 610 a notification filter may comprise analyzing electronic calendar data associated with the user and automatically inferring gating conditions and/or notification handling rules. For example, in one embodiment, queue-type notification handling rules may automatically be implemented for appointments having meta-data indicating that the receiving user may be temporarily occupied in an activity that should not be interrupted by notifications. For example, in one embodiment, queue-type notification handling rules may automatically be implemented for all appointments between 9 A.M.-6 P.M. Mondays-Fridays. In another embodiment, queue-type notification handling rules may automatically be implemented for all appointments associated with work-related meta-data (e.g., all appointments tagged "meeting").

In the embodiment illustrated in FIG. 6, the generated notification filter's notification handling rule(s) indicates that push notifications that satisfy the indicated gating condition(s) be queued for later delivery to the receiving user.

Having generated a notification filter, notification server 200 stores 615 the generated queue-type notification filter associated with the receiving user in an electronic data store, e.g. filter database 400.

At some point, notification server 200 receives 620 a request to push a notification to notification-receiving client device 300A from a requesting user of notification-requesting client device 300C. Notification server 200 then retrieves 625 one or more notification filters associated with the receiving user from the electronic data store (e.g., filter database 400). Notification server 200 then evaluates 630 the retrieved one or more notification filters.

In the embodiment illustrated in FIG. 6, the received notification request is determined to satisfy the gating condition(s) of the queue-type notification filter that was generated 610 and stored 615 in the electronic data store. Applying the notification filter's notification handling rule(s), notification server 200 queues 635 the notification request for later delivery.

In the illustrated embodiment, the notification filter's notification handling rule(s) also indicate that the requesting user be notified that the notification request has been queued for later delivery. Consequently, notification server 200 generates 640 a "request-queued" push notification and provides 645 the "request-queued" push notification to notification-requesting client device 300C. In some embodiments, the "request-queued" push notification may be delivered to the notification-requesting client device 300C via optional push server 110.

Periodically, notification server 200 re-evaluates 650 the queue-type notification filter that was generated 610 and stored 615 in the electronic data store until the notification filter's gating conditions are determined to be no longer satisfied (indicating that the receiving user may now be receptive to the requested push notification). Consequently, notification server 200 generates 660 the requested push notification and provides 665 the requested push notification to notification-receiving client device 300A. In some embodiments, the requested push notification may be delivered to the notification-receiving client device 300A via optional push server 110.

Figure 7:
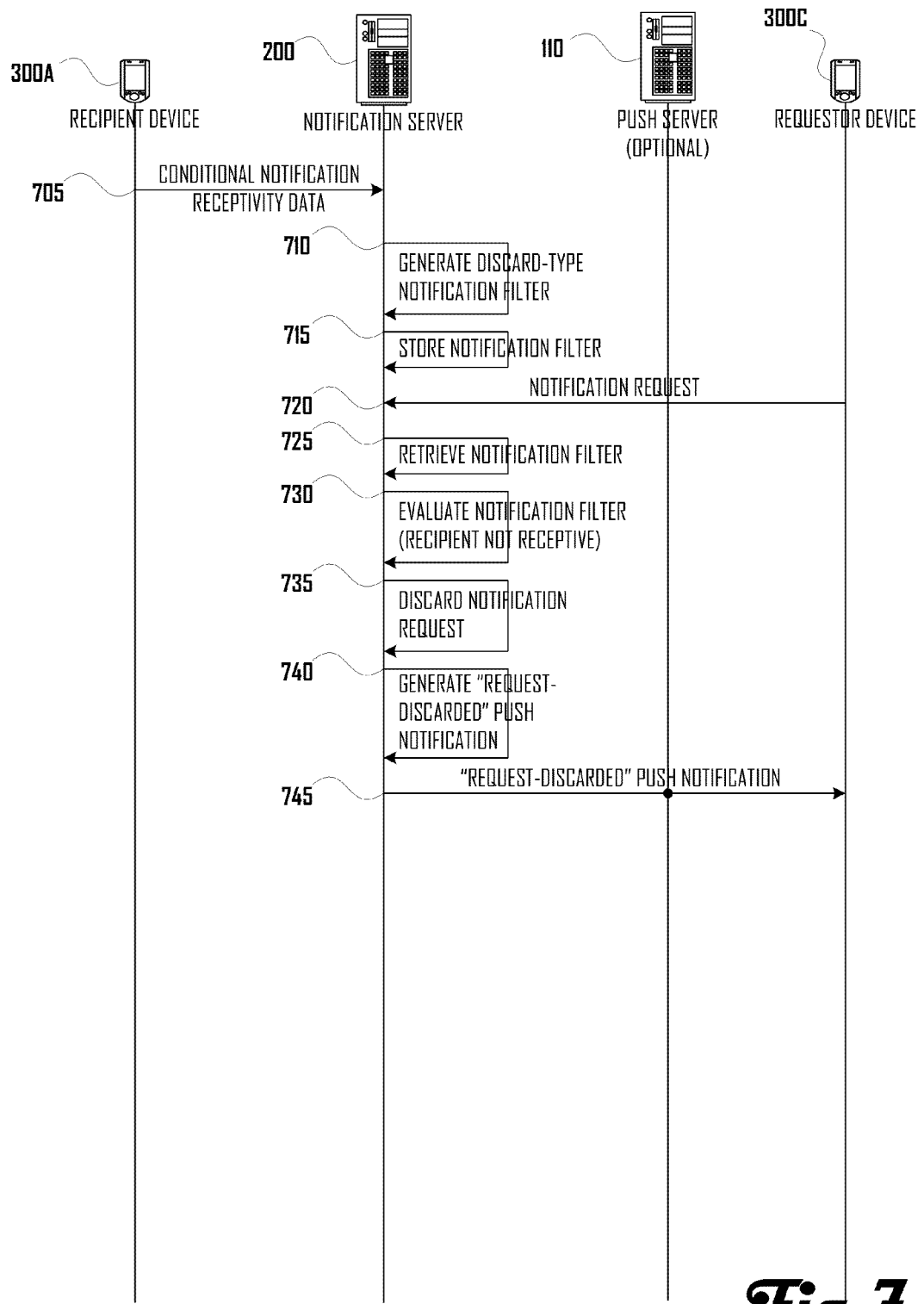

FIG. 7 illustrates an exemplary series of communications between notification-requesting client device 300C, notification server 200, optional push server 110, and notification-receiving client device 300A, in accordance with one embodiment. The illustrated series of communications shows an exemplary scenario in which a user on notification-receiving client device 300A specifies one or more conditions under which a receiving user is not receptive to a push notification from notification-requesting client device 300C.

Beginning the illustrated sequence of operations, the receiving user of notification-receiving client device 300A provides 705 to notification server 200 data indicative of the receiving user's conditional receptivity to push notifications.

In the embodiment illustrated in FIG. 7, the receiving user's conditional notification receptivity data indicates that the receiving user is not receptive to push notifications under certain specified exclusionary gating conditions.

Having received 705 the data indicative of the receiving user's conditional receptivity to push notifications, notification server 200 generates 710 a notification filter accordingly. In some embodiments, generating 710 a notification filter may simply comprise populating a data structure according to explicit user receptivity indications.

For example, the user's conditional notification receptivity data may indicate that notifications should be discarded during the receiving user's vacation between Jul. 26, 2010 and Aug. 1, 2010, in which case generating 710 a notification filter may comprise creating a time-type gating condition and a discard-type notification handling rule, and storing the gating condition and notification handling rule in a filter data structure.

In other embodiments, as discussed above, generating 710 a notification filter may comprise analyzing electronic calendar data associated with the user and automatically inferring gating conditions and/or notification handling rules. For example, in one embodiment, discard-type notification handling rules may automatically be implemented for appointments having meta-data indicating that the receiving user may be occupied in an activity that should not be interrupted by notifications. For example, in one embodiment, discard-type notification handling rules may automatically be implemented for all appointments between 9 A.M.-6 P.M. Mondays-Fridays. In another embodiment, discard-type notification handling rules may automatically be implemented for all appointments associated with work-related meta-data (e.g., all appointments tagged "meeting").

In the embodiment illustrated in FIG. 7, the generated notification filter's notification handling rule(s) indicates that push notifications that satisfy the indicated gating condition(s) be discarded.

Having generated a notification filter, notification server 200 stores 715 the generated queue-type notification filter associated with the receiving user in an electronic data store, e.g. filter database 400.

At some point, notification server 200 receives 720 a request to push a notification to notification-receiving client device 300A from a requesting user of notification-requesting client device 300C. Notification server 200 then retrieves 725 one or more notification filters associated with the receiving user from the electronic data store (e.g., filter database 400). Notification server 200 then evaluates 730 the retrieved one or more notification filters.

In the embodiment illustrated in FIG. 7, the received notification request is determined to satisfy the gating condition(s) of the queue-type notification filter that was generated 710 and stored 715 in the electronic data store. Applying the notification filter's notification handling rule(s), notification server 200 discards 735 the notification request.

In the illustrated embodiment, the notification filter's notification handling rule(s) also indicate that the requesting user be notified that the notification request has been discarded. Consequently, notification server 200 generates 740 a "request-discarded" push notification and provides 745 the "request-discarded" push notification to notification-requesting client device 300C. In some embodiments, the "request-discarded" push notification may be delivered to the notification-requesting client device 300C via optional push server 110.

Figure 8:
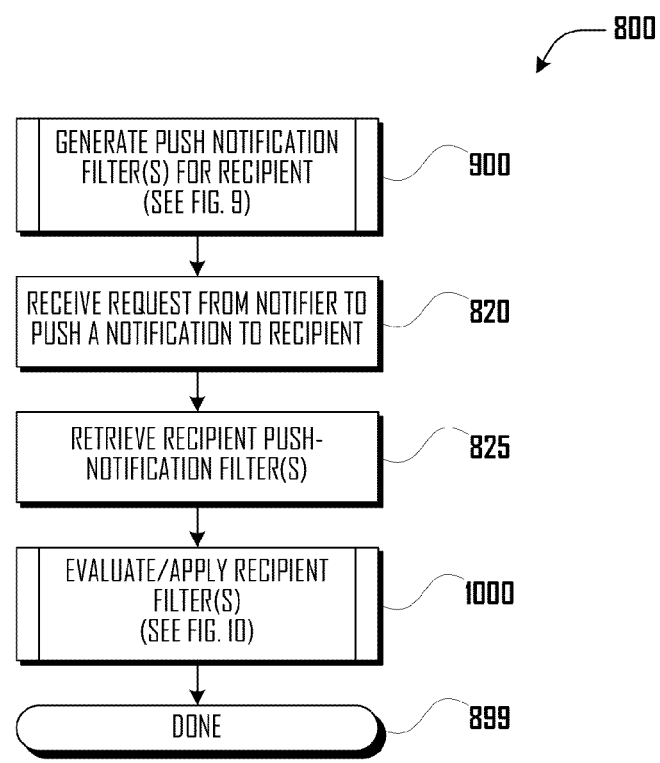
FIG. 8 illustrates a notification request handling routine in accordance with one embodiment.

FIG. 8 illustrates a notification request handling routine 800, such as may be performed by notification server 200 in accordance with one embodiment.

In subroutine block 900 (see FIG. 9, discussed below), routine 800 generates one or more push notification filters associated with a recipient user and stores the one or more push notification filters in an electronic data store (e.g., filter database 400) in association with the recipient user. In block 820, routine 800 receives a request from a remote client device to push a notification to the recipient user. For example, in one embodiment, a user of the requesting device may wish to invite the recipient user to participate in a multi-device game or other multi-device networked application session. In other embodiments, the request to notify the recipient user may originate with an automatic process operating on the requesting client device.

In block 825, routine 800 retrieves one or more push notification filters associated with the recipient user from an electronic data store (e.g., filter database 400). In subroutine block 1000 (see FIG. 10, discussed below), routine 800 evaluates the one or more push notification filters associated with the recipient user and handles the push-notification request accordingly. Routine 800 ends in block 899.

Figure 9:
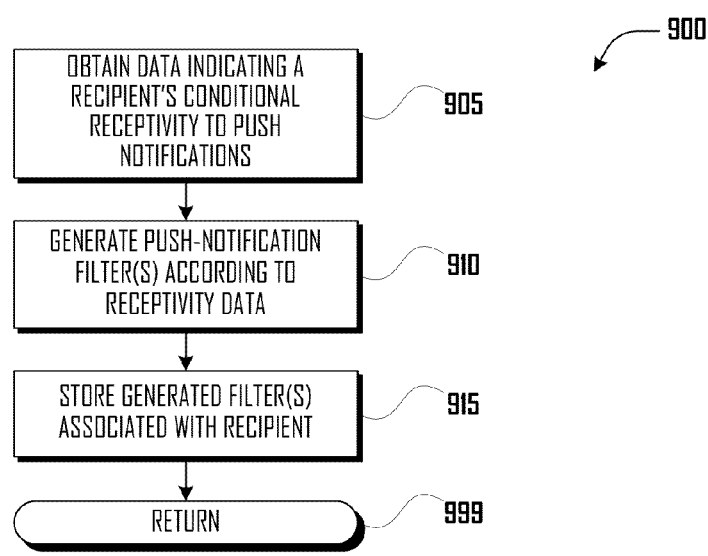
FIG. 9 illustrates a push-notification filter generation subroutine in accordance with one embodiment.

FIG. 9 illustrates a push-notification filter generation subroutine 900 in accordance with one embodiment. In block 905, subroutine 900 obtains data indicating the recipient user's conditional receptivity to push notifications. For example, in one embodiment, subroutine 900 may provide an invitation-control web page allowing the user to specify gating conditions and notification handling rules. In other embodiments, subroutine 900 may provide an invitation-control Web API by which an application on the recipient user's device may communicate the user's receptivity data, it having been gathered via a user interface provided on the receiving user's device by the application. In still other embodiments, subroutine 900 may obtain electronic calendar data associated with the user (e.g., via communication with calendar provider server 120, and/or uploaded from the recipient user's client device), from which conditional receptivity data may be determined. In some embodiments, electronic calendar data associated with the user may be obtained automatically from an online calendar provider according to a predetermined schedule. In other embodiments, electronic calendar data associated with the user may be provided on one or more occasions by the receiving user. Thus, in some embodiments, a recipient user may be able to ensure that he or she will not be interrupted by push notifications during meetings, lunches, or other appointments simply by maintaining an electronic calendar.

In block 910, subroutine 900 generates one or more push notification filters according to the obtained receptivity data. See text, above, accompanying items 510, 610, and 710 in FIGS. 5, 6, and 7 (respectively) discussing the generation of notification filters according to user receptivity data.

In block 915, subroutine 900 stores the generated one or more push notification filters in an electronic data store (e.g., filter database 400), associated with the recipient user. Subroutine 900 ends in block 999, returning to the calling routine.

Figure 10:
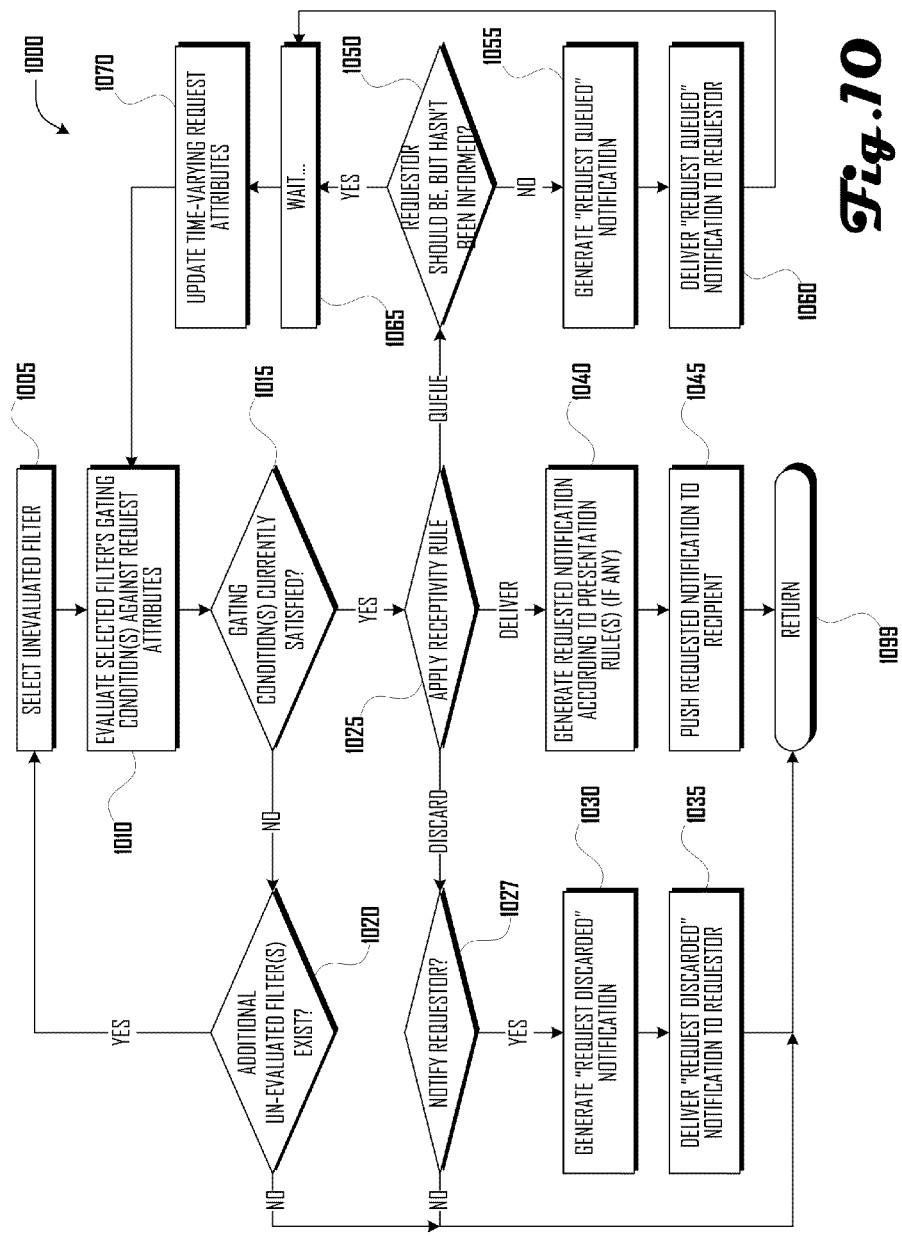
FIG. 10 illustrates a subroutine for evaluating a push notification request in light of one or more push notification filters in accordance with one embodiment.

FIG. 10 illustrates a subroutine 1000 for evaluating a push notification request in light of one or more push notification filters in accordance with one embodiment. In block 1005, subroutine 1000 selects an unevaluated filter from the one or more push notification filters that subroutine 1000 is operating on. In some embodiments, the one or more push notification filters may be ordered according to priority and/or ranking metadata associated with the filters. In some embodiments, the receiving user may have specified priority and/or ordering metadata via a user interface provided by subroutine 900 (see FIG. 9, discussed above). In other embodiments, the one or more push notification filters may be ordered according to other criteria, such as the order in which they were created, the order in which they were returned from an electronic data store (e.g., filter database 400), random order, and the like. In cases in which the one or more push notification filters are ordered according to some criterion, selecting an unevaluated filter may comprise selecting the first (or last) unevaluated filter according to the ordering criterion.

In block 1010, subroutine 1000 compares the currently selected filter's one or more gating conditions against appropriate attributes of the push notification request under evaluation. For example, in various embodiments, subroutine 1000 may evaluate one or more time-related conditions (e.g., gating conditions specifying a time, a time range, a date. and/or a date range) against the time at which the receiving device would receive the notification. In many embodiments, the time at which the receiving device would receive the notification may be within a few seconds or minutes of the current time. In other embodiments, the request may specify a future date and/or time for delivery of the requested notification, in which case the one or more time-related conditions would be evaluated against the specified future delivery time. In some embodiments, the one or more time-related conditions would be evaluated against a determined current local time on the receiving device.

In various embodiments, subroutine 1000 may evaluate one or more sender-related conditions (e.g., a set of one or more indicated sending user identities, one or more indicated sending devices, one or more indicated sending applications, one or more characteristics and/or attributes of a sending user/device/application, and the like) against the identity or other attribute/characteristic of the user, device, and/or application associated with the push notification request under evaluation. For example, in various embodiments, various sender-related conditions may be satisfied when the requesting user is (or is not) "John," when the requesting user is (or is not) a member of the recipient user's group of friends, when the requesting user is male or female, when the requesting application is (or is not) a card-game application, when the requesting device is (or is not) an iPhone, and the like.

In various embodiments, subroutine 1000 may evaluate one or more location-related conditions (e.g., a current or recent geographical location of the requesting device and/or recipient device) against a determined location of the requesting and/or recipient device associated with the push notification request under evaluation. In some embodiments, to determine a location of the requesting and/or recipient device subroutine 1000 may communicate with the remote device in question to obtain the device's current location. In other embodiments, subroutine 1000 may determine whether the requesting and/or recipient device has recently "checked in" or otherwise reported its location, either to the device performing subroutine 1000 (e.g., notification server 200) or to another online-accessible service that will return recent location indications from the device in question. In some embodiments, the request itself may include location information associated with the requesting device.

Having evaluated, in block 1010, the currently-selected filter's one or more gating conditions against appropriate attributes of the push notification request, subroutine 1000 determines in decision block 1015 whether the currently-selected filter's one or more gating conditions are currently collectively satisfied. If not, then subroutine 1000 either proceeds to select the next unevaluated filter in block 1005 or ends in block 1099, depending on whether it is determined in decision block 1020 that one or more additional unevaluated filters exist.

When in decision block 1015, subroutine 1000 determines that the currently-selected filter's one or more gating conditions are currently collectively satisfied, then in decision block 1025, subroutine 1000 applies a notification handling rule according to the currently-selected filter, depending on the type of the receptivity push-notification handling rule.

If the type of the currently-selected filter's receptivity push-notification handling rule indicates that the request under evaluation should be discarded, then in decision block 1027, subroutine 1000 determines whether the requestor should be informed that the push-notification request will not be delivered. For example, in one embodiment, subroutine 1000 may apply a policy to notify or not notify requestors of discarded requests. In other embodiments, the currently selected filter may include additional push-notification handling rules that indicate whether the requestor should be informed that the push-notification request would not be delivered. If the requestor should not be informed, then subroutine 1000 ends in block 1099. On the other hand, if the requestor should be informed, then in block 1030, subroutine 1000 generates a "request discarded" notification (e.g., a push notification, a Short Message Service or "SMS" message, an email message, or the like). Subroutine 1000 delivers the "request discarded" notification via an appropriate communication channel in block 1035, before ending in block 1099.

If the type of the currently-selected filter's receptivity push-notification handling rule indicates in block 1025 that the request under evaluation should be delivered, then in block 1040, subroutine 1000 generates the requested push notification and pushes it to the recipient device in block 1045. In some embodiments, pushing the requested notification may include providing it to a push server 110, such as an APNS server or a C2DM server. Subroutine 1000 then ends in block 1099, returning to the caller.

If the type of the currently-selected filter's receptivity push-notification handling rule indicates in block 1025 that the request under evaluation should be queued, then in decision block 1050, subroutine 1000 determines whether the requestor should be informed, but has not yet been informed. For example, in one embodiment, subroutine 1000 may apply a policy to notify or not notify requestors of queued requests. In other embodiments, the currently selected filter may include additional push-notification handling rules that indicate whether the requestor should be informed that the push-notification request would be queued for possible later delivery. If the requestor should be informed, but has not yet been informed, then in block 1055, subroutine 1000 generates a "request queued" notification (e.g., a push notification, an SMS message, an email message, or the like). Subroutine 1000 delivers the "request queued" notification via an appropriate communication channel in block 1060.

When the requestor has been informed (or when the requestor should not be informed), then in block 1065, subroutine 1000 waits for a period of time before updating one or more time-varying request attributes in block 1070. For example, the delivery time of the requested notification may be updated to reflect the current time. In some embodiments, a current location of the recipient device (and/or the requesting device) may also be updated. For example, in some embodiments, to update a current location of the requesting and/or recipient device, subroutine 1000 may communicate with the remote device in question to obtain the device's current location. In other embodiments, subroutine 1000 may determine whether the requesting and/or recipient device has recently "checked in" or otherwise reported its location, either to the device performing subroutine 1000 (e.g., notification server 200) or to another online-accessible service that will return recent location indications from the device in question.

After one or more time-varying attributes of the notification request under evaluation have been updated in block 1070, subroutine 1000 re-evaluates the selected filter's gating condition(s) against the updated attributes of the notification request. At some point, the currently selected filter's gating conditions may no longer be satisfied. For example, in various embodiments, the current time may no longer satisfy a time-related gating condition, the current location of the recipient (and/or the requestor) may no longer satisfy a location-related condition, or the like.

When the currently selected filter's gating conditions are longer satisfied, then subroutine 1000 may proceed to evaluate the next filter (if any), which may indicate that the request should be delivered. Thus, the recipient user may be able to defer notifications until he or she is receptive to receiving them. For example, in some embodiments, the recipient user may be able to defer receiving notifications during working hours, during meetings, during classes, during sleeping hours, and the like, queuing any notifications received until a specified time period has elapsed. In other embodiments, the recipient user may be able to defer receiving notifications while the recipient user is present at a specified location (or locations) or is not present at a specified location (or locations), queuing any notifications received while the recipient user is at the location where he or she works for later delivery after the recipient user arrives at the location where he or she resides (for example).

Figure 11:
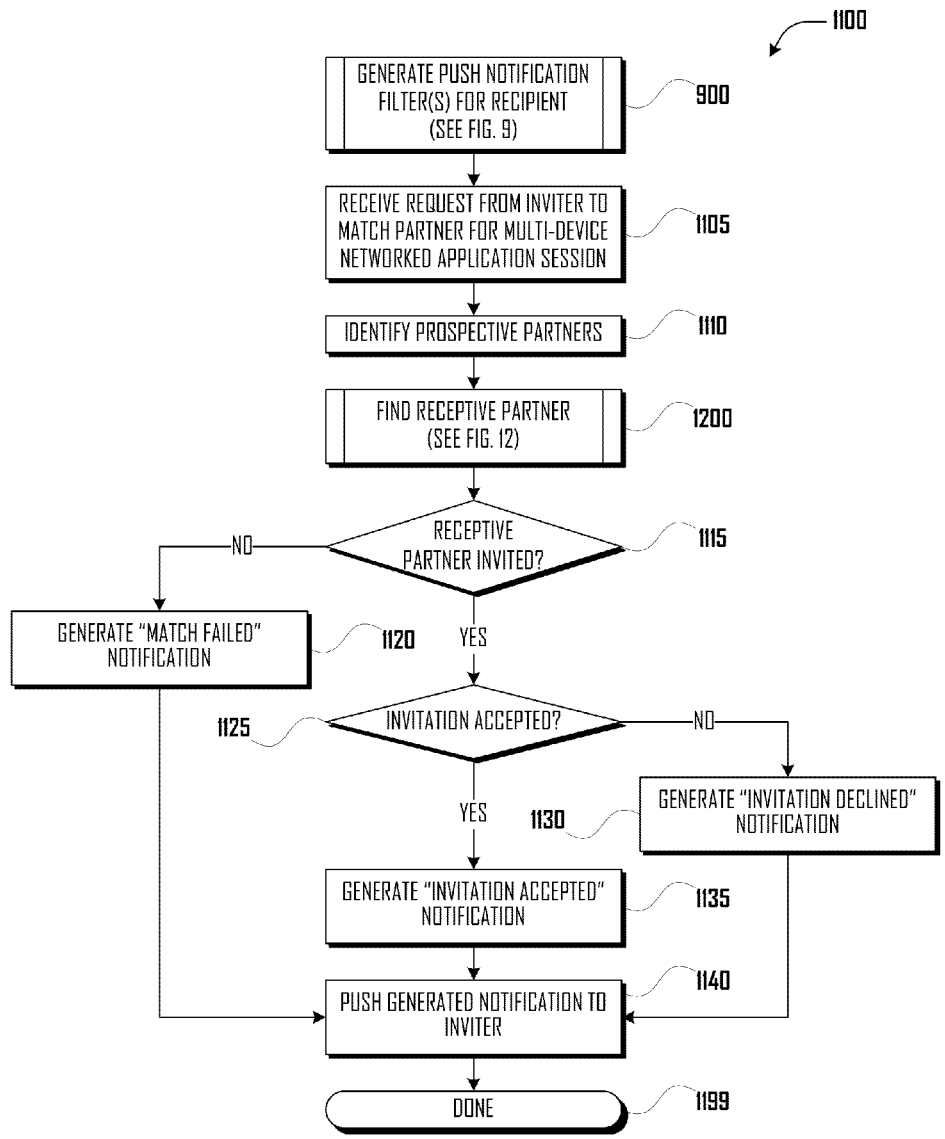
FIG. 11 illustrates a matching-partner invitation routine in accordance with one embodiment.

FIG. 11 illustrates an exemplary use case enabled by the notification controls disclosed herein, namely a matching-partner invitation routine 1100 in accordance with one embodiment. In subroutine block 900 (see FIG. 9, discussed above), routine 1100 generates one or more push notification filters associated with a recipient user and stores the one or more push notification filters in an electronic data store (e.g., filter database 400) in association with the recipient user.

In block 1105, routine 1100 receives a request from an inviter user on a remote client device to match the inviter user with one or more partners in a multi-device application session. As the term is used herein, a "multi-device application session" refers to a series of contemporaneous interactions involving at least two users of at least two devices (often, but not always physically remote from one another) via a series of networked communications between an instance of an application on a first device (operated by a first user) and an instance of the application on a second device (operated by a second user). For example, in various embodiments, a multi-device application session may comprise a multiplayer game, such as card games, "shooter" games, fighting or combat games, and the like; a multi-user interactive text, audio, and/or video conference session; a multi-user productivity application session; a virtual-reality interactive session; and the like.

In block 1100, routine 1100 identifies a plurality of prospective partners, such as registered users who have previously indicated that in some conditions, they may be receptive to invitations to join sessions such as the requested multi-device application session.

In subroutine block 1200 (see FIG. 12, discussed below), routine 1100 attempts to identify and invite at least one currently receptive partner. In decision block 1115, routine 1100 determines whether at least one currently receptive partner was invited to the requested multi-device application session. If not, then in block 1120, routine 1100 generates a "match failed" notification. Subroutine 1000 provides the "match failed" notification for delivery to the requestor in block 1140. In some embodiments, the "match failed" notification may be delivered to the notification-receiving client device 300A via optional push server 110.

On the other hand, if in block 1115, at least one currently receptive partner was invited to the requested multi-device application session, then in block 125, routine 1100 determines whether the invitation (or invitations) was accepted. Routine 1100 generates an "invitation accepted" or an "invitation declined" notification in block 1135 or block 1130, respectively, before provides generated notification for delivery to the requestor in block 1140. In some embodiments, the generated notification may be delivered to the notification-receiving client device 300A via optional push server 110.

Routine 1100 ends in block 1199.

Figure 12:
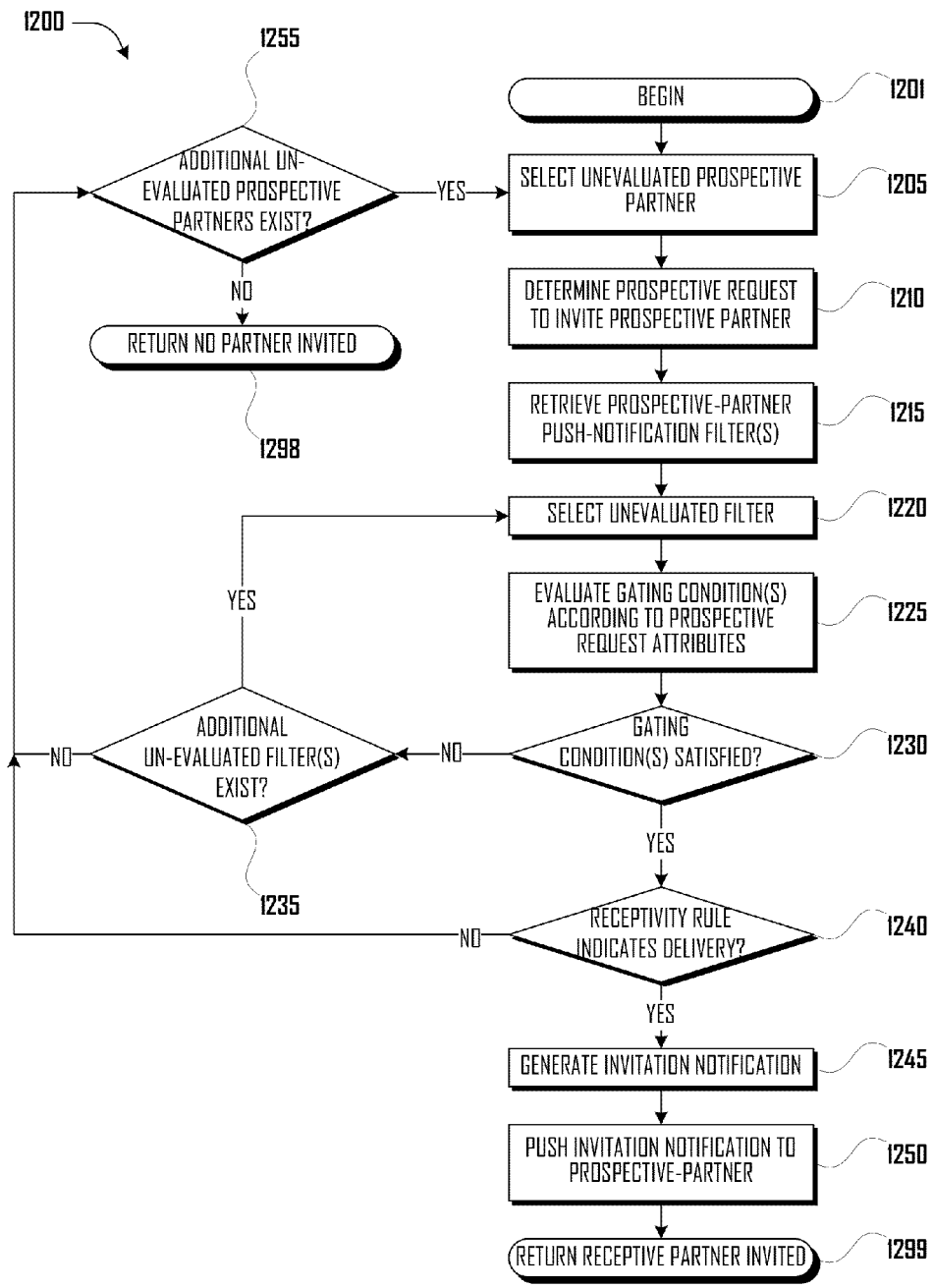
FIG. 12 illustrates a subroutine for identifying and inviting one or more currently receptive partners from a set of prospective partners for a requested multi-device application session, in accordance with one embodiment.

FIG. 12 illustrates a subroutine 1200 for identifying and inviting one or more currently receptive partners from a set of prospective partners for a requested multi-device application session, in accordance with one embodiment.

Subroutine 1200 begins in block 1201. In block 1205, subroutine 1200 selects from the set of prospective partners a prospective partner whose receptivity to an invitation has not been evaluated. In various embodiments, the set of prospective partners may be ordered according to some criteria, such as the order in which they registered, the order in which they were returned from an electronic data store (e.g., filter database 400), a random order, and the like. In such embodiments, selecting an un-evaluated prospective partner may comprise selecting the next (or the previous) un-evaluated prospective partner according to the partner ordering criteria.

In block 1210, subroutine 1200 determines attributes that would be associated with a prospective request to invite the selected prospective partner to the requested multi-device application session. In block 1215, subroutine 1200 retrieves one or more push notification filters associated with the selected prospective partner from an electronic data store (e.g., filter database 400).

In block 1220, subroutine 1200 selects an unevaluated filter from the one or more push notification filters retrieved in block 1215. In some embodiments, the one or more push notification filters may be ordered according to priority and/or ranking metadata associated with the filters. In some embodiments, the selected prospective partner may have specified priority and/or ordering metadata when specifying the filters. In other embodiments, the one or more push notification filters may be ordered according to other criteria, such as the order in which they were created, the order in which they were returned from an electronic data store (e.g., filter database 400), random order, and the like. In cases in which the one or more push notification filters are ordered according to some criterion, selecting an unevaluated filter may comprise selecting the first (or last) unevaluated filter according to the ordering criterion.

In block 1225, subroutine 1200 compares the currently selected filter's one or more gating conditions against appropriate attributes of the prospective request to invite the selected prospective partner. For example, in various embodiments, subroutine 1200 may evaluate one or more time-related conditions, sender-related conditions, location-related conditions, and/or other similar types of conditions. (The text accompanying block 1010 in FIG. 10, above, provides a more detailed discussion of gating condition evaluation.)

Having evaluated the currently-selected filter's one or more gating conditions against appropriate attributes of the prospective request to invite the selected prospective partner, subroutine 1200 determines in decision block 1230 whether the currently-selected filter's one or more gating conditions are currently collectively satisfied. If not, then in decision block 1235, subroutine 1200 determines whether one or more additional unevaluated filters exist and proceeds to select the next unevaluated filter in block 1220 if an additional unevaluated filter exists. If no additional unevaluated filters exist, then in decision block 1255, subroutine 1200 determines whether an additional un-evaluated prospective partner exists. If an additional un-evaluated prospective partner exists, then in block 1205 subroutine 1200 selects and proceeds to evaluate the next prospective partner. If all prospective partners have been evaluated, then subroutine 1200 ends in block 1298, returning an indication that no partner was invited.

On the other hand, if subroutine 1200 determines in decision block 1230 that the currently-selected filter's one or more gating conditions are currently collectively satisfied, then in decision block 1240, subroutine 1200 determines whether the currently-selected filter's receptivity notification handling rule indicates that the prospective invitation should be delivered. If not (e.g., if the currently-selected filter's receptivity notification handling rule indicates that the prospective invitation should be discarded or queued), then in decision block 1255, subroutine 1200 determines whether an additional un-evaluated prospective partner exists. If an additional un-evaluated prospective partner exists, then in block 1205 subroutine 1200 selects and proceeds to evaluate the next prospective partner. If all prospective partners have been evaluated, then subroutine 1200 ends in block 1298, returning an indication that no partner was invited.

However, if in decision block 1240, subroutine 1200 determines that the currently-selected filter's receptivity notification handling rule indicates that the prospective invitation should be delivered, then in block 1245, subroutine 1200 generates an push notification inviting the selected prospective partner to join the requested multi-device application session. In block 1250, subroutine 1200 pushes the invitation push notification to a client device associated with the currently selected prospective partner. In some embodiments, pushing the invitation push notification may include providing it to a platform provider server 110, such as an APNS server or a C2DM server. Subroutine 1200 then ends in block 1099, returning to the caller an indication that the currently selected prospective partner was invited to join the requested multi-device application session.

In some embodiments, before ending, subroutine 1200 may determine (not shown) whether additional prospective partners should be evaluated to receive an invitation. If so, and if additional un-evaluated prospective partners exist, then in such embodiments, subroutine 1200 may cycle back (not shown) to block 1205 to select and proceed to evaluate an additional prospective partner.

Figure 13:
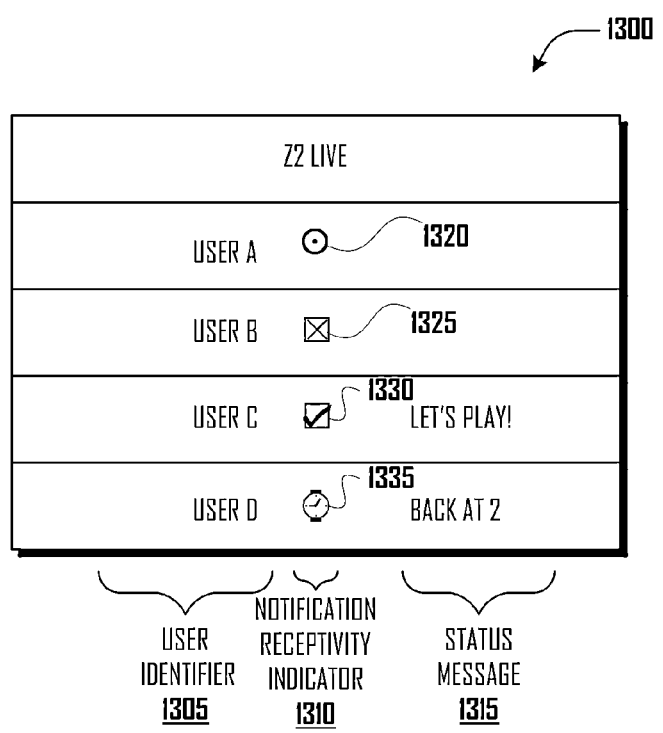
FIG. 13 illustrates an exemplary status display user interface, in accordance with one embodiment.

FIG. 13 illustrates an exemplary status display user interface 1300, such as may be provided to client device 300 from notification server 200, in accordance with one embodiment. In some embodiments, user interface 1300 may be used to indicate current notification receptivity settings for one or more users. For example, in one embodiment, a list of a user's "friends" may be displayed in a "lobby" portion of a multi-device-capable application, such as a game. User interface 1300 includes a user identifier 1305 portion, an indicator 1310 graphically depicting the user's current receptivity state, and an optional status message 1315. In various embodiments, various graphical elements may be used to indicate various receptivity states (e.g., currently receptive, temporarily un-receptive, un-receptive, and the like). For example, in one embodiment, graphical elements such as 1330 (currently receptive); 1320 (receptive, but user offline or not signed-in); 1335 (temporarily un-receptive); 1325 (un-receptive). In other embodiments, colored graphical elements may be used to indicate receptivity state, e.g. green dot (currently receptive); gray dot (receptive, but user offline); red dot (temporarily un-receptive); red "X" (un-receptive).

Figure 14:
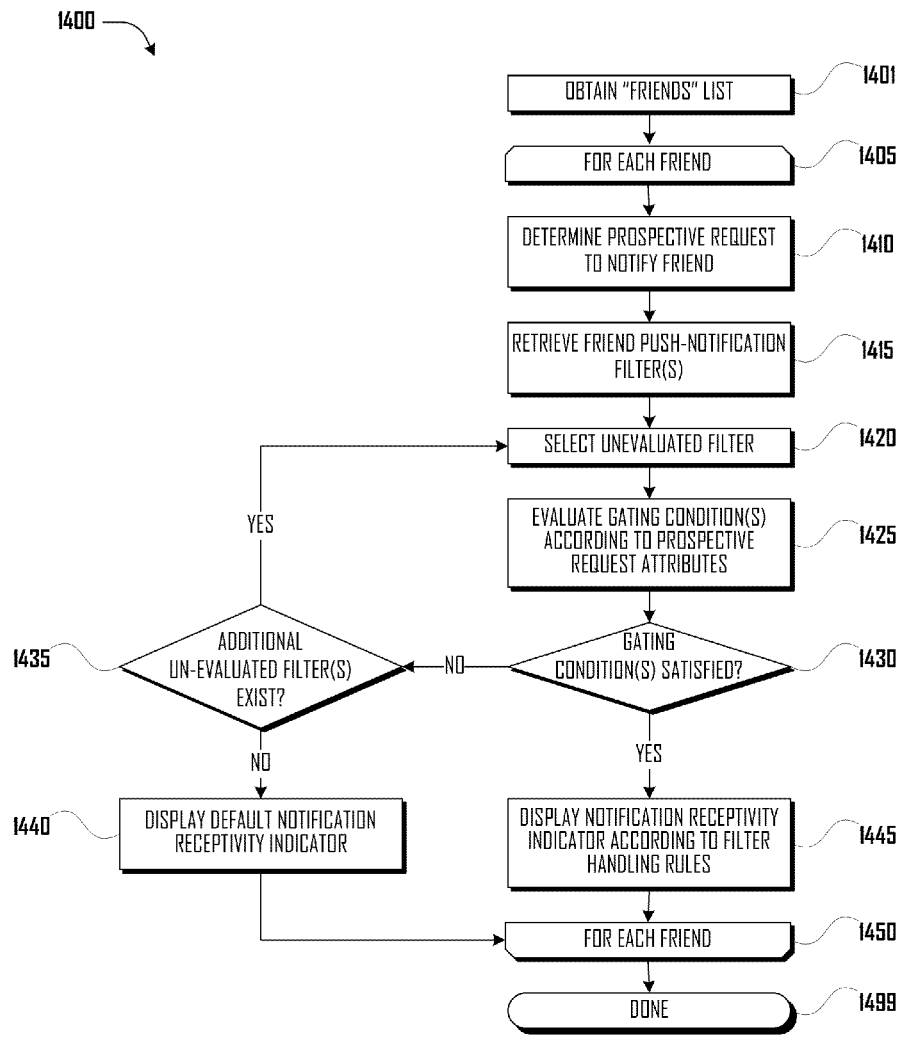
FIG. 14 illustrates a multi-user status display routine in accordance with one embodiment.

FIG. 14 illustrates a multi-user status display routine 1400 for display to a signed-in user, in accordance with one embodiment. Subroutine 1400 begins in block 1401 by obtaining a list of one or more other users, referred to herein as "friends." In one embodiment, the one or more other users may refer to users with whom the signed-in user has interacted with before or who are otherwise known to the signed-in user. In some embodiments, the one or more other users may refer to users who are nearby to the signed-in user, to other users who have previously engaged in a multi-device session of a particular application, and the like.

In beginning loop block 1405, subroutine 1400 evaluates each of the one or more "friend" users in turn. In block 1410, subroutine 1400 determines attributes that would be associated with a prospective notification request from the signed-in user to the current friend user (e.g., a request to invite the current friend user to a multi-device application session). In block 1415, subroutine 1400 retrieves one or more push notification filters associated with the current friend user from an electronic data store (e.g., filter database 400).

In block 1420, subroutine 1400 selects an unevaluated filter from the one or more push notification filters retrieved in block 1415. In some embodiments, the one or more push notification filters may be ordered according to priority and/or ranking metadata associated with the filters. In some embodiments, the selected prospective partner may have specified priority and/or ordering metadata when specifying the filters. In other embodiments, the one or more push notification filters may be ordered according to other criteria, such as the order in which they were created, the order in which they were returned from an electronic data store (e.g., filter database 400), random order, and the like. In cases in which the one or more push notification filters are ordered according to some criterion, selecting an unevaluated filter may comprise selecting the first (or last) unevaluated filter according to the ordering criterion.

In block 1425, subroutine 1400 compares the currently selected filter's one or more gating conditions against appropriate attributes of the prospective request to notify the current friend user. For example, in various embodiments, subroutine 1400 may evaluate one or more time-related conditions, sender-related conditions, location-related conditions, and/or other similar types of conditions. (The text accompanying block 1010 in FIG. 10, above, provides a more detailed discussion of gating condition evaluation.)

Having evaluated the currently-selected filter's one or more gating conditions against appropriate attributes of the prospective request to notify the current friend user, subroutine 1400 determines in decision block 1430 whether the currently-selected filter's one or more gating conditions are currently collectively satisfied. If not, then in decision block 1435, subroutine 1400 determines whether one or more additional unevaluated filters exist and proceeds to select the next unevaluated filter in block 1420 if an additional unevaluated filter exists. If no additional unevaluated filters exist, then in decision block 1440, subroutine 1400 may in various embodiments display a default status indicator for the current friend user, may display no status indicator for the current friend user, or the like.

On the other hand, if subroutine 1400 determines in decision block 1430 that the currently-selected filter's one or more gating conditions are currently collectively satisfied, then in block 1445, subroutine 1400 displays a notification receptivity indicator according to the currently-selected filter's receptivity notification handling rule. For example, if the currently-selected filter's receptivity notification handling rule indicates that a currently-requested notification from the signed-in user should be delivered, then subroutine 1400 may display a "currently receptive" indicator for the current friend user if the current friend user is currently signed-in or a "user not signed-in" indicator if the current friend user not currently signed in. Similarly, if the currently-selected filter's receptivity notification handling rule indicates that a currently-requested notification from the signed-in user should be queued for later delivery, then subroutine 1400 may display a "temporarily un-receptive" indication for the current friend user. If the currently-selected filter's receptivity notification handling rule indicates that a currently-requested notification from the signed-in user should be discarded, then subroutine 1400 may display an "un-receptive" indication for the current friend user. Additionally, in some embodiments, subroutine 1400 may display a status message associated with the currently selected filter (if any) for the current friend user.

In ending loop block 1450, subroutine 1400 cycles back to block 1405 to process the next friend user (if any). Once all friend users have been processed, subroutine 1400 ends in block 1499.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A server-implemented method of handling push, invitations, the method comprising:

obtaining, by a server, a push-invitation filter indicating an invitee user's conditional receptivity to push invitations targeting a first mobile device operated by said invitee user, said push-invitation filter comprising at least one push-invitation handling rule and at least one gating condition indicating whether said at least one push-invitation handling rule may be applied, said at least one gating condition comprising at least one of a time-related condition, a sending-user-related condition, and a sending-application-related condition;

associating, in a data store, said push-invitation filter with said invitee user;

receiving, at a receipt time by said server from a second mobile device operated by an invitor user, a push-invitation request targeting said first mobile device, said push-invitation request comprising a plurality of indications including a recipient, namely, said invitee user; a sending user, namely, said invitor user; an invitation payload inviting said invitee user to join a multi-device networked-application session; and a sending application;

selecting, by said server, said push-invitation filter from said data store according to at least said indicated recipient of said received push invitation;

determining, by said server, whether one or more of said receipt time and said plurality of request indications satisfy said at least one gating condition; and when said at least one gating condition is satisfied, handling, by said server, said push-invitation request according to said at least one push-invitation handling rule.

2. The method of claim 1, wherein said at least one gating condition includes a time-related condition, and wherein said at least one push-invitation handling rule indicates that push-invitation requests be queued while said time-related condition is satisfied.

3. The method of claim 2, wherein said receipt time is determined to satisfy said time-related condition, the method further comprising:

periodically determining whether said time-related condition remains satisfied;

when said time-related condition is determined to be no longer satisfied, generating a push invitation according to said push-invitation request and said at least one push-invitation handling rule; and providing said generated push invitation for delivery to said first mobile device.

4. The method of claim 1, wherein said at least one gating condition includes a time-related condition, and wherein said at least one push-invitation handling rule indicates that said sending user be notified when said time-related condition is satisfied.

5. The method of claim 4, wherein said receipt time is determined to satisfy said time-related condition, and wherein handling said push-invitation request according to said at least one push-invitation handling rule comprises:

automatically generating a responsive push invitation informing said sending user that said received push invitation will be delivered at a later time; and providing said responsive push invitation for delivery to said second mobile device.

6. The method of claim 1, wherein said at least one gating condition indicates that said at least one push-invitation handling rule may be applied when a push invitation is requested from one or more indicated sending users.

7. The method of claim 1, wherein said at least one gating condition indicates that said at least one push-invitation handling rule may be applied when a push invitation is requested via one or more indicated sending applications.

8. The method of claim 1, wherein said at least one gating condition includes a time-related condition, and wherein said at least one push-invitation handling rule indicates that push-invitation requests be fulfilled if said time-related condition is satisfied.

9. The method of claim 1, wherein said at least one push-invitation handling rule indicates that when a push invitation is received, at least one of the following presentation items should or should not be presented by a receiving mobile device:
- a notification sound;
- a notification message; and
- a notification icon badge.

10. An apparatus comprising a processor and a memory containing instructions that, when executed by the processor, configure the apparatus to perform the method of claim 1.

11. A non-transitory computer-readable storage medium storing instructions that, when executed by a processor, configure the processor to perform the method of claim 1.

12. A server-implemented method of handling push notifications, the method comprising:
- obtaining, by a server, a push-notification filter indicating a first user's conditional receptivity to push notifications targeting a first mobile device operated by said first user, said push-notification filter comprising at least one push-notification handling rule and at least one location-related gating condition indicating that said at least one push-notification handling rule may be applied according to a determined location of said first mobile device;
- associating, in a data store, said push-notification filter with said first user;
- receiving, at a receipt time by said server from a second mobile device operated by a second user, a push-notification request targeting said first mobile device;
- selecting, by said server, said push-notification filter from said data store according to at least said indicated recipient of said received push notification;
- determining, by said server, a current location of said first mobile device;
- determining, by said server, whether said current location satisfies said at least one location-related gating condition; and
- when said at least one location-related gating condition is satisfied, handling, by said server, said push-notification request according to said at least one push-notification handling rule.

13. The method of claim 12, wherein said at least one push-notification handling rule indicates that push-notification requests be queued according to said location-related gating condition and said determined location of said first mobile device.

14. The method of claim 13, further comprising:
- periodically determining said current location of said first mobile device and re-evaluating said location-related gating condition accordingly;
- when indicated according to said periodically re-evaluated location-related gating condition, generating a push notification according to said push-notification request and said at least one push-notification handling rule; and
- providing said generated push notification for delivery to said first mobile device.

15. A server-implemented method of handling push notifications, the method comprising:
- obtaining, by a server, a push-notification filter indicating a first user's conditional receptivity to push notifications targeting a first mobile device operated by said first user, said push-notification filter comprising at least one push-notification handling rule and at least one gating condition indicating whether said at least one push-notification handling rule may be applied, said at least one gating condition comprising at least one of a time-related condition, a sending-user-related condition, and a sending-application-related condition;
- associating, in a data store, said push-notification filter with said first user;
- receiving, at a receipt time by said server from a second mobile device operated by a second user, a push-notification request targeting said first mobile device, said push-notification request comprising a plurality of indications including a recipient, namely, said first user; a sending user, namely, said second user; a payload; and a sending application;
- selecting, by said server, said push-notification filter from said data store according to at least said indicated recipient of said received push notification;
- determining, by said server, whether one or more of said receipt time and said plurality of request indications satisfy said at least one gating condition; and
- when said at least one gating condition is satisfied, handling, by said server, said push-notification request according to said at least one push-notification handling rule;
- further comprising:
  - obtaining a second push-notification filter associated with said first user, said second push-notification filter comprising a second at least one push-notification handling rule and a second at least one gating condition; and
  - associating said second push-notification filter in said data store with a filter priority associated with said first user.

16. The method of claim 15, further comprising, when said at least one gating condition is not satisfied:
- selecting said second push-notification filter from said data store according to at least said filter priority;
- determining whether one or more of said receipt time and said plurality of push-notification indications satisfy said second at least one gating condition; and
- when said second at least one gating condition is satisfied, handling said push-notification request according to said second at least one push-notification handling rule.

17. A server-implemented method of handling push notifications, the method comprising:
- obtaining, by a server, a push-notification filter indicating a first user's conditional receptivity to push notifications targeting a first mobile device operated by said first user, said push-notification filter comprising at least one push-notification handling rule and said time-related gating condition indicating whether said at least one push-notification handling rule may be applied;
- associating, in a data store, said push-notification filter with said first user;
- receiving, at a receipt time by said server from a second mobile device operated by a second user, a push-notification request targeting said first mobile device, said push-notification request comprising a plurality of indications including a recipient, namely, said first user; a sending user, namely, said second user; a payload; and a sending application;
- selecting, by said server, said push-notification filter from said data store according to at least said indicated recipient of said received push notification;

determining, by said server, whether one or more of said receipt time and said plurality of request indications satisfy said time-related gating condition; and when said time-related gating condition is satisfied, handling, by said server, said push-notification request according to said at least one push-notification handling rule;

wherein obtaining said push-notification filter associated with said first user comprises automatically generating said time-related gating condition and said at least one push-notification handling rule according to electronic calendar data associated with said first user.

18. A server-implemented method of handling push notifications, the method comprising:

obtaining, by a server, a push-notification filter indicating a first user's conditional receptivity to push notifications targeting a first mobile device operated by said first user, said push-notification filter comprising at least one push-notification handling rule and at least one gating condition indicating whether said at least one push-notification handling rule may be applied, said at least one gating condition comprising at least one of a time-related condition, a sending-user-related condition, and a sending-application-related condition;

associating, in a data store, said push-notification filter with said first user;

receiving an indication from a prospective push-notification sender to evaluate said first user's current receptivity to a prospective push notification from said prospective push-notification sender;

selecting from said data store at least one push-notification filter associated with said first user;

generating a user interface including a current status indicator indicating whether said prospective push notification from said prospective push-notification sender would currently satisfy said at least one push-notification filter; and providing said user interface to said prospective push-notification sender.

19. A server-implemented method of handling push notifications, the method comprising:

obtaining, by a server, a push-notification filter indicating a first user's conditional receptivity to push notifications targeting a first mobile device operated by said first user, said push-notification filter comprising at least one push-notification handling rule and at least one gating condition indicating whether said at least one push-notification handling rule may be applied, said at least one gating condition comprising at least one of a time-related condition, a sending-user-related condition, and a sending-application-related condition;

associating, in a data store, said push-notification filter with said first user;

receiving from an invitee mobile-device user a request for a partner mobile-device user to join a multi-device networked-application session;

identifying said first user as a prospective partner user who may be receptive to an invitation to join said multi-device networked-application session;

determining whether a prospective push-notification-invitation to join said multi-device networked-application session from said first mobile-device user would currently satisfy said at least one gating condition of said push-notification filter; and when said at least one gating condition is satisfied, generating and delivering to said first mobile device said push-notification-invitation to join said multi-device networked-application session.

20. The method of claim 19, wherein identifying said first user as a prospective partner user comprises:

identifying a plurality of mobile-device users who are currently signed-in to a networked-application session; and selecting said first user from said identified plurality of currently-signed-in mobile-device users.

21. The method of claim 19, wherein identifying said first user as a prospective partner user comprises:

identifying a plurality of mobile-device users who are not currently signed-in to, but may be receptive to join, a networked-application session; and selecting said first user from said identified plurality of not-currently-signed-in mobile-device users.

* * * * *